July 23, 1929.  A. SONSTHAGEN ET AL  1,722,115
APPARATUS FOR MIXING, COMPACTING, DEGASSING,
OR GRINDING MORE OR LESS VISCID MATERIAL
Filed Aug. 26, 1927  2 Sheets-Sheet 1
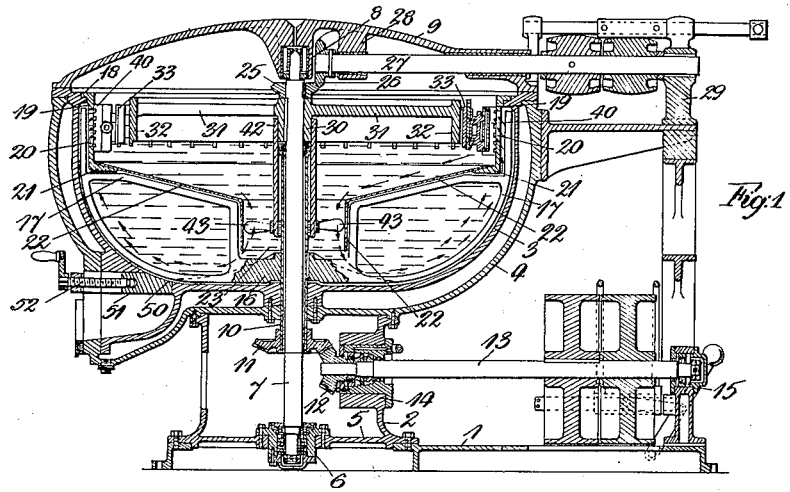
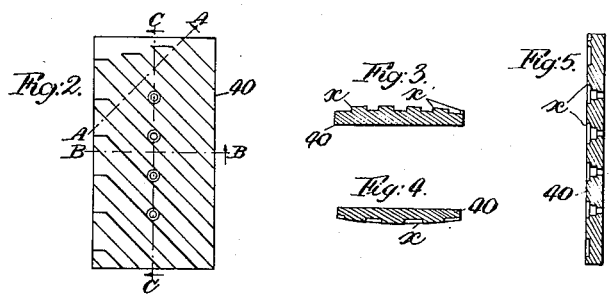
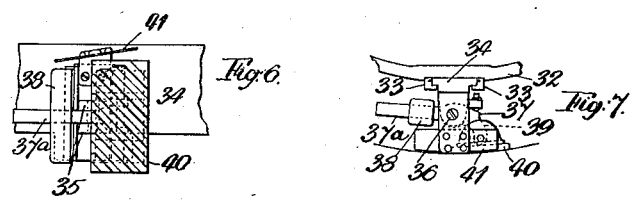
Inventors;
Asbjorn Sonsthagen,
Gudolf Poverud,
By their Att'y,

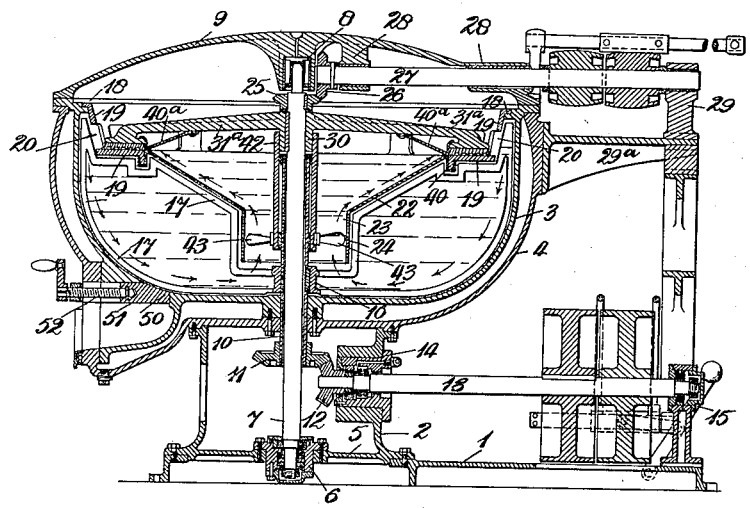

Patented July 23, 1929.

1,722,115

UNITED STATES PATENT OFFICE.

ASBJORN SONSTHAGEN, OF SNARESBROOK, LONDON, AND GUDOLF MARINIUS POVERUD, OF NORWICH, ENGLAND.

APPARATUS FOR MIXING, COMPACTING, DEGASSING, OR GRINDING MORE OR LESS VISCID MATERIAL.

Application filed August 26, 1927, Serial No. 215,634, and in Great Britain April 6, 1927.

This invention relates to apparatus for mixing, compacting, degassing or grinding more or less viscid material, and it refers particularly to apparatus in which the aforesaid treatment is effected by subjecting a thin layer or film of the material to be treated to a rubbing or beating action. With apparatus referred to it is essential for the efficient working of the said apparatus that a sufficient supply of material be provided to maintain the layer, and further that provision be made whereby the gas expelled from the material during the treatment be provided with a ready means of escape. It is further advisable that provision be made whereby the temperature of the material may be controlled during treatment.

The present invention has for its object certain improvements whereby the aforesaid desired essentials may be secured.

The invention moreover provides for the regulation of the pressure to which the material is subjected during the rubbing operation, or for regulating the force of the blow, where the material is subjected to a beating action.

According to the present invention the effective surface or surfaces of one or both of the rubbing elements or the effective surface of the beating element or the surface against or upon which said beater acts or both, are provided with grinding or other surfaces together with grooves or channels which traverse the said grinding or other surfaces in a manner such as to permit an excess of material to be circulated therethrough. By this means not only is the film or layer of material to be acted upon properly maintained but the excess of the material acts to cool the grinding or other surfaces. The channels are of such width and depth as to more than accommodate the desired amount of material and to leave a clear space whereby the gas which is released from the material during the rubbing or beating treatment may readily escape.

The invention may be embodied in various forms and types of machine of which the following may be taken as examples. One form of machine may consist of a suitable container divided into two compartments, or two or more containers, separate or disposed one within the other, may be used, with means for producing a circulation of material between them. A suitable surface is disposed in the circulation path of the material, and means are provided for distributing a portion of the material in the form of a film over said surface. A propeller, pump, or any other suitable impelling means may be employed to ensure efficient circulation of the mass. For example, we may employ propellers of the type forming the subject of British Patents Nos. 256,486 and 234,683.

In order that the invention may be the better understood drawings are appended in which:

Fig. 1 is a vertical section of a machine embodying the present improvements.

Fig. 2 is a front view showing more clearly the grinding, rubbing or beating surface.

Fig. 3 is a section on line A—A Fig. 2.

Fig. 4 is a section on line B—B Fig. 2.

Fig. 5 is a section on line C—C Fig. 2.

Fig. 6 a front view of an arrangement for supporting the element acting upon the material in which the pressure of the rubbing element is controlled by centrifugal force.

Fig. 7 is a plan view of the rubbing element shown in Fig. 6.

Fig. 8 is a front view of a further arrangement in which centrifugal force is utilized to control the pressure between the rubbing element and the surface with which it cooperates.

Fig. 9 is a plan view of the rubbing element shown in Fig. 8.

Fig. 10 is a vertical section of a modified form of machine to that shown in Fig. 1.

Fig. 11 is a front view showing certain details more clearly in connection with the rubbing element.

Fig. 12 is a plan view of the rubbing element shown in Fig. 11.

Referring to Fig. 1 of the appended drawings, 1 indicates a suitable base plate having a hollow pedestal 2 supporting a pan 3 provided with a jacket 4 through which a suitable heating or cooling medium may be caused to circulate.

Secured to the plate 5 forming the bottom of the pedestal 2 is a footstep bearing 6 supporting the lower end of a vertically disposed shaft 7, the upper end of which is supported by a bearing 8 secured to the lid or cover 9 of the pan 3.

Revolubly mounted upon the shaft 7 is a sleeve 10 to which is secured a pinion 11 engaging a second pinion 12 mounted upon a belt driven shaft 13 supported in bearings 14, 15. Secured to the sleeve 10 and located adjacent the bottom of the pan 3 is a boss 16 carrying frames such as 17 whereby the material within the pan is kept in motion. Preferably the limbs of the frame are of V shaped or other cross sectional outline calculated to present a more or less so called "stream line" section.

Secured to the top of the pan is an annular body 18 having a downwardly projecting wall or flange 19 provided with slots or openings 20. The flange 19 at its lower end is provided with a substantially horizontally disposed inwardly projecting flange 21 serving to support a dished body 22 having a central opening 23 from which projects downwardly a tubular body 24.

The plates or vanes 17 are so shaped that their outer and inner edges respectively lie closely against the inner surface of the pan and the outer surfaces of flanges 19, 21 and bodies 22 and 24.

Secured in any suitable manner to the upper end of the vertical shaft 7 is a pinion 25 engaging a pinion 26 mounted upon a horizontally disposed belt driven shaft 27 supported by bearings 28 and 29 carried by the cover 9 of pan 3, and the bracket 29ª respectively.

Secured to the shaft 7 is a boss 30 having radially disposed arms 31 having their outer ends connected to an annular member 32 to which are secured plates such as 33 having guides thereon to engage a vertically adjustable slipper 34 provided with lugs 35 perforated for the passage of a pin 36 upon which is pivotally mounted a lever 37, one end of which is in the form of an arm or rod 37ª upon which is adjustably mounted a weight 38. The opposite end of the lever 37 has pivotally connected thereto by means of lugs 39 a plate 40 whereby the desired grinding or other treatment of the material is effected.

The front of the plate 40 is curved more or less to the curvature of the surface with which it cooperates and it has formed upon its active or effective surface a series of inclined channels shown more clearly in Figs. 1 to 5 and Fig. 11. The outer edges of the rear side walls of said channels are sharp, the outer edges of the forward walls being slightly rounded as shown at $x$ in Figs. 3 and 4. The channels are inclined downwardly transversely of the plate 40 away from the direction of motion, the width of the channels being such that not only do they provide for the ready passage of the material but there is a sufficient unoccupied space to permit the ready escape of the air or gas which is freed from the material by the action of the plate 40.

In order to facilitate the discharge of the air or gas, plates or vanes such as shown at 41 Figs. 6 and 7 may be provided disposed above the upper ends of plates 40 and inclined horizontally whereby as the arms 31 move they cause a brisk current of air to pass across the tops of the channels which acts to draw the air or gas from said channels.

Secured at its upper end to the boss 30 is a sleeve 42 extending downwardly to a point somewhat above the lower end of the tubular portion 24 of the dished body 22, and secured to said sleeve 42 is a propeller 43, the action of which is to draw the material downwards through the part 24 forcing it upwards upon the lower side of part 22 and through the aforesaid slots or openings 20 in pan 3 as shown by the arrows in Figs. 1 and 10.

As the material emerges through these openings it encounters the plates 40, which, running at a comparatively high speed, impact thereagainst with considerable force thereafter smearing or spreading a thin film of the material over the surface of the front of the outer surface of the plate 40. At the same time the material enters the channels of said plate along which it is caused to travel in a downward direction until free of the channels when it is subject to the action of the propeller 43. The material is thus caused to circulate continuously through the machine.

In order to prevent any regurgitation of the material from the channels of plate 40, there may be provided at the lower end of said plate a baffle in the form of a plate 44 Figs. 11 and 12 secured to the slipper 34 or the brackets 45 and inclined as shown. By this means any back pressure which might act to prevent the ready passage of the material from the channels of plate 40 is prevented.

It will be understood that the pressure of the plate 40 against the material must be such as to maintain a thin film between the active surface of said plate and the imperforate surface of the pan. This is effected by adjusting the weight 38 longitudinally of the arm of lever 37, the adjustment of the said weight towards or away from the pivot of the lever causing the plate to bear with more or less pressure upon the film, the weight in effect more or less counterbalancing the effect of centrifugal force acting upon the plate 40.

According to the modification shown in Figs. 8 and 9 a counterweight is dispensed with and a lever 44ª is employed supported from a slipper substantially in the manner already described in connection with the device shown in Figs. 6 and 7. In this case however, the movement of the body 40 towards the side of the pan is opposed by a spring 45 arranged to engage the front of the arm, its inward movement being checked by the stop 46. The adjustment of the pressure of the spring is effected by means of the set stud 46ª upon the tail end of the lever which stud engages an arm 47 upon the support to which the plate 40 is secured. The spring 45 is mounted independently of the lever and as the arms carrying the parts move round, said spring opposes more or less opposition to the outward movement of plate 40 under the action of centrifugal force.

Provision may be made as in the former case for causing the air or gas to pass away through the channels of plate 40 and for preventing regurgitation of the material whilst throughout the foregoing description it has been assumed that the surface upon which the material is treated is disposed in the vertical plane it may be horizontally disposed as shown in Fig. 10 of the drawings. In this case the machine as a whole is substantially as already described except that the surface upon which the material is treated is as just stated arranged in the horizontal plane, a corresponding arrangement being made in respect of the plate 40.

Obviously instead of being either vertical or horizontal the plate 40 and the surface with which it cooperates may be inclined at any suitable angle. The plate 40 where arranged in or substantially in the horizontal plane would not be subjected to the action of centrifugal force urging them towards the surface with which they cooperate and consequently provision would be made whereby a positive adjustment of the body towards or away from the surface co-operating therewith would be necessary.

As already stated the surface cooperating with the grinding or beating element may be grooved or channelled, the face of the grinding or beating element being left plain or provided with similar channels.

To empty the pan an opening is formed therein at 50 for which a door 51 is provided operated by the screw 52.

As an alternative to forming channels in the grinders or beaters in such a manner that these serve to create a flow of the excess material, separate rotatable plates or scrapers may be used for this purpose, and with such plates or scrapers may be combined means for scraping from the stationary wall the thin film of material which has been under the action of the grinders or beaters as well as the excess material. Instead of having channels sloping from the vertical as above described, the scrapers may be formed simply as plates or knives set at a suitable angle so that they exert the required effort to cause movement of the material they scrape off. Or any other suitable arrangement may be employed for effecting the removal of the material as described.

We have described how we may use in our improved apparatus a stationary vertical wall upon which the film of material is formed. As an alternative we may employ a rotating horizontal member on which to form the film, or such member may have its film surface disposed at any suitable angle to the horizontal plane. In such case the grinding plates, scrapers, or the like may be stationary, and any convenient means may be employed for adjusting the pressure these exert on the film surface. It will be understood that such a horizontal member may be readily adapted to afford automatic means for distributing the film uniformly over the surface. In this construction also any suitable propeller, pump, or other impelling means may be utilized to ensure efficient circulation of the mass. Such impelling means may, if desired be combined in any convenient way with the rotating horizontal member, or may form part of such member.

As shown in Fig. 10 a fixed horizontally disposed surface may be employed with which cooperates a horizontally disposed grinding plate.

In this case a horizontally disposed annular flange is provided at the lower end of the flange 19 with which cooperate the grinding plates 40 mounted directly upon radially disposed arms 31ª, the propeller 43 in this case being so arranged or driven that the material is caused to circulate, as shown by the arrows, in the upward direction through the tubular body 24 and the dished body 22 whereby a constant supply of material is caused to flow onto the said annular flange and through the openings or slots 20. In order to increase the amount of material passing between the grinding plates and the flange, deflecting plates 40ª are secured upon the arms 31ª in such a position that they act to deflect the upward currents of material towards the grinding plates and flange.

In order to facilitate the removal of the gases expelled from the material under treatment, suitable means may be provided to form an air circulation system or the like. For example means may be provided whereby an air draught can be drawn in through suitable apertures leading to the centre of the machine, further apertures at or near the periphery being provided for its subsequent escape. In any such arrangement suitable fans may be employed to create or assist such an air draught, or the central rotary body may be so formed, or may have suitable parts attached adapted to create such a draught.

It is obvious that ventilating means as above described can be conveniently utilized to assist in cooling or otherwise tempering the material.

Claims:

1. Apparatus for mixing, compacting, degassing or grinding more or less viscid material comprising a surface for supporting the material to be acted upon, means acting upon said material, channels upon the effective surface of said means designed to permit the ready passage of the material therethrough and the free escape of gas expelled from the material.

2. Apparatus for mixing, compacting, degassing or grinding more or less viscid material, comprising a surface for supporting the material to be acted upon, means for supplying the material to said surface, means acting upon said material, channels upon the effective surface of said means designed to permit the ready passage of the material therethrough and the free escape of gas expelled from the material.

3. Apparatus for mixing, compacting, degassing or grinding more or less viscid material comprising a fixed surface for supporting the material to be acted upon, a moving body acting upon said material, channels in the effective surface of said body designed to permit the ready passage of the material therethrough and the free escape of the gas expelled from the material.

4. Apparatus for mixing, compacting, degassing or grinding more or less viscid material, comprising a fixed vertically disposed surface for supporting the material to be acted upon, a moving body acting upon said material, channels in the effective surface of said body designed to permit the ready passage of the material therethrough and the free escape of the gas expelled from the material.

5. Apparatus for mixing, compacting, degassing or grinding more or less viscid material comprising a fixed surface for supporting the material to be acted upon, a moving body acting upon said material, channels in the effective surface of said body designed to permit the ready passage of the material both in the direction of said channels as well as at an angle to the same, the latter movement allowing the free escape of the gas expelled from the material.

6. Apparatus for mixing, compacting, degassing or grinding more or less viscid material, comprising a fixed vertical surface, means for supplying the material to said surface, a moving body acting upon said material, channels in the effective surface of said body designed to permit the ready passage of the material therethrough and the free escape of the gas expelled from the material.

7. Apparatus for mixing, compacting, degassing or grinding more or less viscid material comprising a surface for supporting the material, a body acting upon the material, inclined channels in the effective surface of the said body said channels being of such dimensions as to permit the passage of the material, and to leave a space for the escape of gas expelled from the material.

8. Apparatus for mixing, compacting, degassing or grinding more or less viscid material comprising a surface for supporting the material, a body acting upon the material, inclined channels in the effective surface of the said body, said channels being of such dimensions as to permit the passage of the material and to leave a space for the escape of gas expelled from the material, and means for preventing the return of the material through said channels.

9. Apparatus for mixing, compacting, degassing or grinding more or less viscid material, comprising a surface for supporting the material, a body acting upon the material, inclined channels in the effective surface of the said body, said channels being of such dimensions as to permit the passage of the material and to leave a space for the escape of gas expelled from the material, and means for drawing the gas through said channels.

10. Apparatus for mixing, compacting, degassing or grinding more or less viscid material, comprising a surface for supporting the material, a body acting upon the material, inclined channels in the effective surface of the said body, said channels being of such dimensions as to permit the passage of the material and to leave a space for the escape of gas expelled from the material, means for preventing the return of the material through said channels, and means for drawing the gas through said channels.

11. Apparatus for mixing, compacting, degassing or grinding more or less viscid material, comprising a vertically disposed fixed surface for supporting the material, a body acting upon the material, inclined channels in the effective surface of the said body, said channels being of such dimensions as to permit the passage of the material and to leave a space for the escape of gas expelled from the material.

12. Apparatus for mixing, compacting, degassing or grinding more or less viscid material, comprising a fixed surface for supporting the material, a body acting upon the material, inclined channels in the effective surface of said body, said channels being of such dimensions as to permit the passage of the material and to leave a space for the escape of gas expelled from the material, and means for preventing the return of the material through said channels.

13. Apparatus for mixing, compacting, degassing or grinding more or less viscid material, comprising a vertically disposed fixed surface for supporting the material, means for supplying the material to said surface, a horizontally disposed rotary element, bodies upon said element adapted to act upon the material, vertically inclined channels in the effective surface of said body, said channels being of such width as to permit the passage of the material, and to leave a space for the escape of gas expelled from the said material.

14. Apparatus for mixing, compacting, degassing or grinding more or less viscid material, comprising a surface for supporting the material, a body acting upon the material, inclined channels in the effective surface of the said body, said channels being of such dimensions as to permit the passage of the material, and to leave a space for the escape of gas expelled from the material, means for preventing the return of the material through said channels, means for drawing the gas through said channels, and means for regulating the pressure of the bodies upon the material.

15. Apparatus for mixing, compacting, degassing or grinding more or less viscid material, comprising a surface for supporting the material, a body acting upon the material, inclined channels in the effective surface of the said body, said channels being of such dimensions as to permit the passage of the material and to leave a space for the escape of gas expelled from the material, means for preventing the return of the material through said channels, means for drawing the gas through said channels, and centrifugally controlled means for regulating the pressure of the bodies upon the material.

16. Apparatus for mixing, compacting, degassing or grinding more or less viscid material, comprising a surface for supporting the material, a body acting upon the material, inclined channels in the effective surface of the said body, said channels being of such dimensions as to permit the passage of the material and to leave a space for the escape of gas expelled from the material, means for preventing the return of the material through said channels, means for drawing the gas through said channels, and spring controlled means for regulating the pressure of the bodies upon the material.

17. Apparatus for mixing, compacting, degassing or grinding more or less viscid material, comprising a receptable, a vertically disposed surface in said receptacle, a horizontally disposed rotary member, bodies upon said member designed to act upon the material, vertically inclined channels in the active surfaces of said bodies, said channels being of such width as to permit the passage of the material, and to leave a space for the escape of the gas expelled from the material, a second receptacle for the material, and means for withdrawing the material from said second receptacle, supplying it to the vertical surface, and returning it to said second receptacle.

18. Apparatus for mixing, compacting, degassing or grinding more or less viscid material, comprising a receptacle, a horizontally disposed surface within said receptacle, a horizontally disposed rotary member, bodies upon said rotary member designed to act upon the material, channels in the active surfaces of said bodies, said channels being of such width as to permit the ready passage of the material and to leave a space for the escape of the gas expelled from the material, a second receptacle for the material, and means for withdrawing the material from said second receptacle, supplying it to the horizontal surface, and returning it to said second receptacle.

19. Apparatus for mixing, compacting, degassing or grinding more or less viscid material, comprising a container for the material, a vertically disposed annular member within said container in spaced relationship to the wall of said container, openings in said annular member, a horizontally disposed rotary member disposed in said receptacle, bodies upon said rotary member designed to act upon the material, channels in the active surfaces of said bodies designed to afford space for the free passage of the material, and for the ready escape of the gas, a horizontally disposed partition in said container whereby same is divided into two compartments, an opening in said partition, a tubular extension at the opening of said partition, a propeller located in said tubular extension whereby the material is caused to circulate through the compartments and through the channels of the body acting upon it.

20. Apparatus for mixing, compacting, degassing or grinding more or less viscid material, comprising a container for the material, a vertically disposed annular member within said container in spaced relationship to the wall of said container, openings in said annular member, a horizontally disposed rotary member disposed in said receptacle, bodies upon said rotary member designed to act upon the material, channels in the active surfaces of said bodies designed to afford space for the free passage of the material and for the ready escape of the gas, a horizontally disposed partition in said container whereby same is divided into two compartments, an opening in said partition, a tubular extension at the opening of said partition, a propeller located in said tubular extension whereby the material is caused to circulate through the compartments and through the channels of the body acting upon it, and means for stirring the material within the second compartment.

21. Apparatus for mixing, compacting, degassing or grinding more or less viscid material, comprising a container for the material, a vertically disposed annular member within said container in spaced relationship to the wall of said container, openings in said annular member, a horizontally disposed rotary member disposed in said receptacle, bodies upon said rotary member designed to act upon the material, channels in the active surfaces of said bodies designed to afford space for the free passage of the material and for the ready escape of the gas, a horizontally disposed partition in said container whereby same is divided into two compartments, an opening in said partition, a tubular extension at the opening of said partition, a propeller located in said tubular extension whereby the material is caused to circulate through the compartments and through the channels of the body acting upon it, and means for preventing the return of the material through said channels.

22. Apparatus for mixing, compacting, degassing or grinding more or less viscid material, comprising a container for the material, a vertically disposed annular member within said container in spaced relationship to the wall of said container, openings in said annular member, a horizontally disposed rotary member disposed in said receptacle, bodies upon said rotary member designed to act upon the material, channels in the active surfaces of said bodies designed to afford space for the free passage of the material and for the ready escape of the gas, a horizontally disposed partition in said container whereby same is divided into two compartments, an opening in said partition, a tubular extension at the opening of said partition, a propeller located in said tubular extension whereby the material is caused to circulate through the compartments and through the channels of the body acting upon it, and means for drawing the gas through said channels.

23. Apparatus for mixing, compacting, degassing or grinding more or less viscid material, comprising a container for the material, a vertically disposed annular member within said container in spaced relationship to the wall of said container, openings in said annular member, a horizontally disposed rotary member disposed in said receptacle, bodies upon said rotary member designed to act upon the material, channels in the active surfaces of said bodies designed to afford space for the free passage of the material and for the ready escape of the gas, a horizontally disposed partition in said container whereby same is divided into two compartments, an opening in said partition, a tubular extension at the opening of said partition, a propeller located in said tubular extension whereby the material is caused to circulate through the compartments and through the channels of the body acting upon it, means for preventing the return of the material through said channels, and means for drawing the gas through said channels.

24. Apparatus for mixing, compacting, degassing or grinding more or less viscid material, comprising a container for the material, a vertically disposed annular member within said container in spaced relationship to the wall of said container, openings in said annular member, a horizontally disposed rotary member disposed in said receptacle, bodies upon said rotary member designed to act upon the material, channels in the active surfaces of said bodies designed to afford space for the free passage of the material and for the ready escape of the gas, a horizontally disposed partition in said container whereby same is divided into two compartments, an opening in said partition, a tubular extension at the opening of said partition, a propeller located in said tubular extension whereby the material is caused to circulate through the compartments and through the channels of the body acting upon it, and means for regulating the pressure of the bodies upon the material.

25. Apparatus for mixing, compacting, degassing or grinding more or less viscid material, comprising a container for the material, a vertically disposed annular member within said container in spaced relationship to the wall of said container, openings in said annular member, a horizontally disposed rotary member disposed in said receptacle, bodies upon said rotary member designed to act upon the material, channels in the active surfaces of said bodies designed to afford space for the free passage of the material and for the ready escape of the gas, a horizontally disposed partition in said container whereby same is divided into two compartments, an opening in said partition, a tubular extension at the opening of said partition, a propeller located in said tubular extension whereby the material is caused to circulate through the compartments and through the channels of the body acting upon it, and centrifugally controlled means for regulating the pressure of the bodies upon the material.

26. Apparatus for mixing, compacting, degassing or grinding more or less viscid material, comprising a container for the material, a vertically disposed annular member within said container in spaced relationship to the wall of said container, openings in said annular member, a horizontally disposed rotary member disposed in said receptacle, bodies upon said rotary member designed to act upon the material, channels in the active surfaces of said bodies designed to afford space for the free passage of the material and for the ready escape of the gas, a horizontally disposed partition in said container whereby same is divided into two compartments, an opening in said partition, a tubular extension at the opening of said partition, a propeller located in said tubular extension whereby the material is caused to circulate through the compartments and through the channels of the body acting upon it, and spring controlled means for regulating the pressure of the bodies upon the material.

27. Apparatus for mixing, compacting, degassing, or grinding more or less viscid material, comprising a container for the material, a vertically disposed annular member within said container in spaced relationship to the wall of said container, an annular horizontally disposed member supported by said vertical member, openings in said vertically disposed annular member, a horizontally disposed rotary member, bodies on said rotary member designed to act upon the material, channels on the active surfaces of said bodies designed to afford space for the free passage of the material and for the ready escape of the gas, a horizontally disposed partition in said container whereby same is divided into two compartments, an opening in said partition, a tubular extension at the opening in said partition, a propeller located in said tubular extension whereby the material is caused to circulate through the two compartments passing through the channels of the body acting upon the material.

28. Apparatus for mixing, compacting, degassing or grinding more or less viscid material, comprising a container for the material, a vertically disposed annular member within said container in spaced relationship to the wall of said container, an annular horizontally disposed member supported by said vertical member, openings in said vertically disposed annular member, a horizontally disposed rotary member, bodies on said rotary member designed to act upon the material, channels in the active surfaces of said bodies designed to afford space for the free passage of the material and for the ready escape of the gas, a horizontally disposed partition in said container whereby same is divided into two compartments, an opening in said partition, a tubular extension at the opening in said partition, a propeller located in said tubular extension whereby the material is caused to circulate through the two compartments passing through the channels of the body acting upon the material, and means for stirring the material in the second compartment.

In testimony whereof we have hereunto set our hands.

ASBJORN SONSTHAGEN.
GUDOLF MARINIUS POVERUD.